Patented Aug. 18, 1953

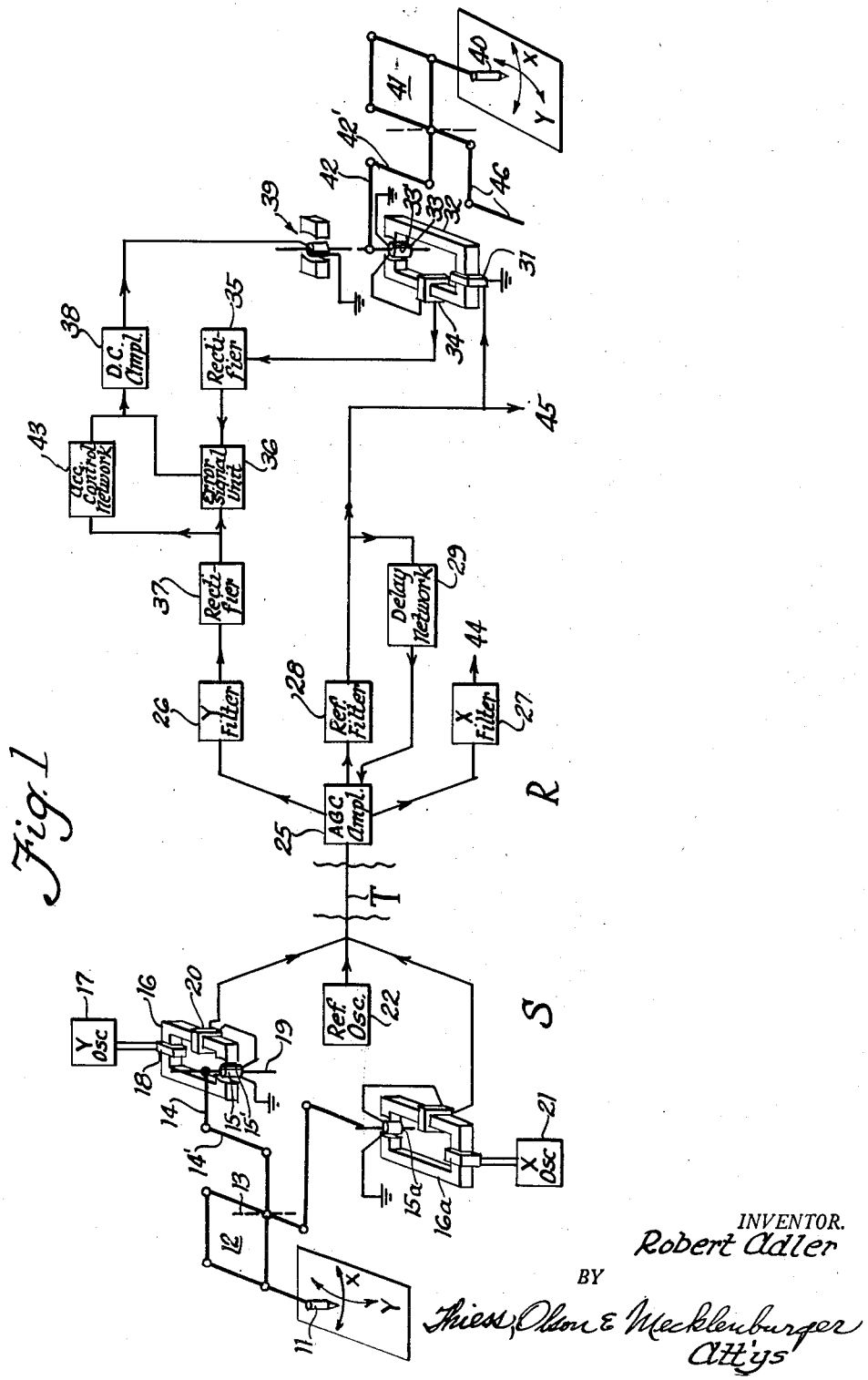

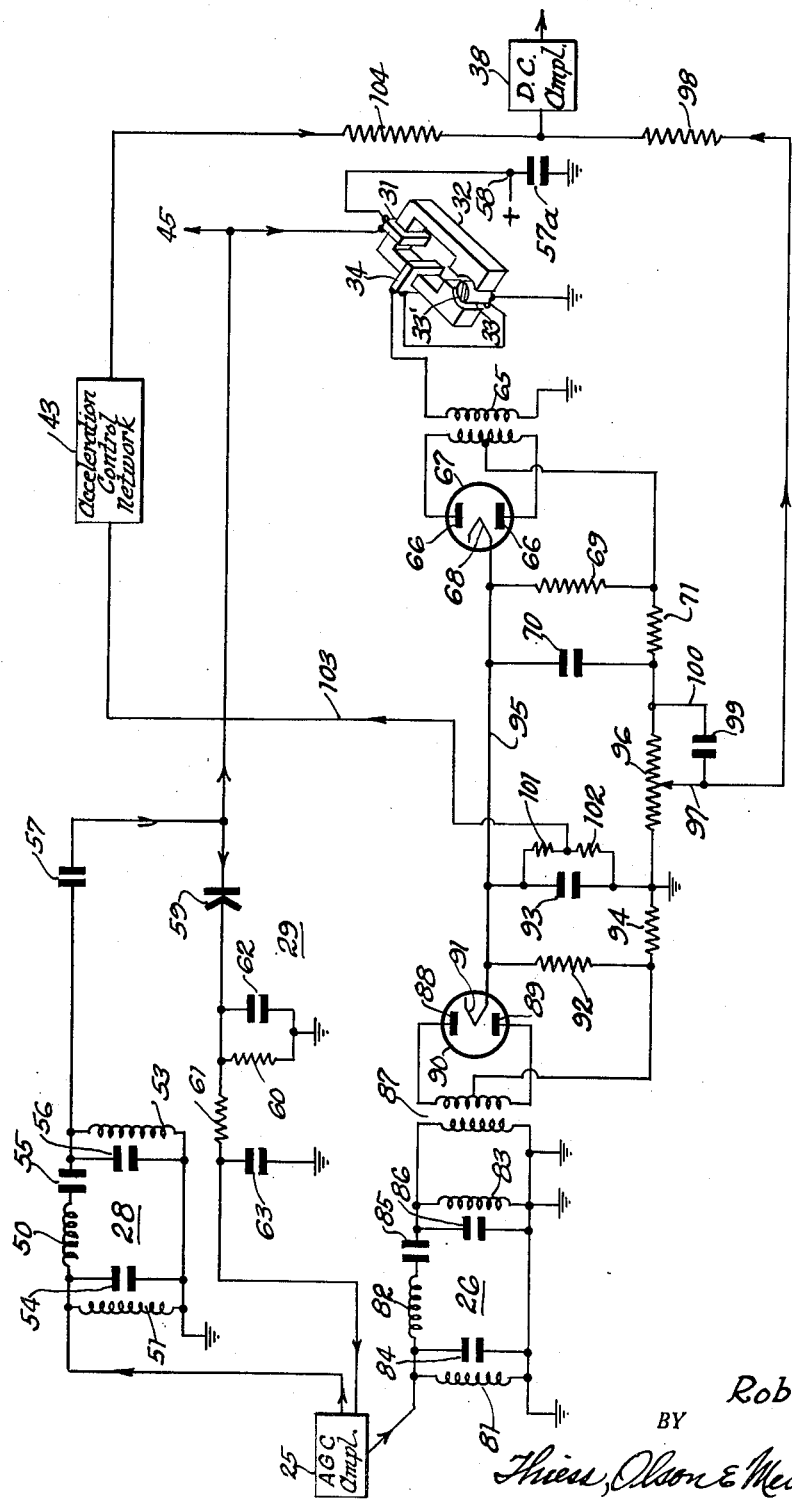

2,649,503

UNITED STATES PATENT OFFICE 2,649,503

METHOD AND APPARATUS FOR SIGNAL COMMUNICATION

Robert Adler, Chicago, Ill., assignor to Consolidated Electric Company, Chicago, Ill., a corporation of Illinois Application November 2, 1949, Serial No. 125,015

6 Claims. (Cl. 178—18)

This invention relates to a method and apparatus for reducing or eliminating the effect of adverse or extraneous variations in the magnitude of an electric intelligence signal and is of particular advantage where such signal carries intelligence in the form of a variable magnitude. It is an object of the invention to provide an improved method and apparatus of that character.

An electric signal which passes over a transmission line or through other electrical apparatus commonly suffers some attenuation or, in some cases, amplification or other adverse variations in magnitude. In systems in which the signal is intended to transmit intelligence, as, for example, in tele-autographic systems, these adverse variations in the magnitude of the signal are objectionable. This is particularly true where the intelligence carried by the signal is in the form of magnitude variations thereof since any extraneous variations in the magnitude of the signal result in an inaccurate interpretation of the intelligence intended to be conveyed.

The conditions causing the extraneous variations in signal magnitude are commonly unknown or indeterminate and consequently they cannot be accurately compensated for by a predetermined amplification of the signal, and the intelligence signal itself cannot be used in determining the extent of such extraneous variations since the magnitude of the signal is purposefully varied as a means of conveying intelligence thereby. To avoid these difficulties, one form of prior apparatus has utilized a variable frequency type of signal since the frequency of a signal once generated is not changed by factors external to the system. However, a variable magnitude system, as, for example, one involving a variable amplitude alternating current signal, has certain advantages over a variable frequency system. These advantages are well known in the art and include such factors as the ability to pass several such signals in the frequency band employed by a single variable frequency signal system and the ability to use narrower band pass filters with consequent simplification and decrease in cost.

Accordingly, it is another object of the invention to provide an improved method and apparatus for conveying intelligence by means of a variable magnitude signal.

The invention is particularly applicable to a servo type follow-up system, that is a system in which a transmitted intelligence signal is continuously compared with a locally generated signal which is determined at each instance by the position of a receiving or follow-up element and in which the receiving element is moved to positions corresponding to those of a directing element under the influence of a difference signal or error signal produced by such comparison.

According to one embodiment of the invention, a reference signal of constant magnitude or amplitude is generated and is subjected to conditions the same as or similar to those to which the intelligence signal is subjected. Under these circumstances the reference signal will be attenuated, amplified or otherwise varied in the same proportion as the intelligence signal is varied. The reference signal, as attenuated or otherwise affected, is utilized to excite or condition the local generator of the servo mechanism.

The output of the local generator is made to be a linear function of the attenuated reference signal as well as a function of the position of the receiving element, and, accordingly, will be attenuated or amplified in the same proportion as the reference signal and the intelligence signal. The error signal produced by the comparison will be attenuated, for example, in the same proportion as the signals being compared but will be zero when the follow-up element is in the proper position with respect to the directing element, as will subsequently be explained in greater detail.

In such a servo system where the receiver is constructed to operate satisfactorily at intelligence and reference signal levels of certain values, attenuation or other adverse variations of the signal values causes variations in the dynamic characteristics of the receiver, for example, it may be over or under damped, with consequent errors, particularly in the transient response of the follow-up element.

In one embodiment of the invention, this source of error is substantially eliminated by utilizing an automatic gain control amplifier which amplifies both the reference signal and the intelligence signals by the same ratio, the amplifier being regulated from the reference signal which, as generated, is of constant magnitude.

Under circumstances where the signal attenuation, for example, resulting from the transmission thereof, is reasonably constant and of a known value, a fixed gain amplifier may be employed to maintain the signals at approximately the desired predetermined values.

Accordingly, it is another object of this invention to provide an improved method and apparatus for controlling a servo mechanism to compensate for attenuation or other undesirable deviation in a variable magnitude intelligence signal.

It is another object of the invention to provide an improved tele-autographic system utilizing a variable magnitude signal and which is substantially unaffected by extraneous variations in magnitude of such signal.

It is another object of the invention to provide an improved method and apparatus for substantially eliminating the effects of adverse variations in the magnitude of a variable magnitude intelligence signal.

This invention, together with further objects and advantages thereof, will best be understood by reference to the following description taken in connection with the accompanying drawings, and its scope will be pointed out in the appended claims.

In the drawings, in which like parts are designated by like reference numerals:

Fig. 1 is primarily a block diagram illustrating an application of the invention to a follow-up system; and Fig. 2 is a diagram showing in greater detail certain parts of the circuit illustrated in Fig. 1.

The invention is shown embodied in a tele-autographic system including a sending station S and a receiving station R, connected by a transmission line T, as may be seen in Fig. 1.

The sending station includes a directing element comprising a stylus 11, a linkage mechanism 12 which is pivoted about a fixed axis 13, and further link members 14 and 14' and the X axis equivalents interconnecting the stylus 11 with rotating members 15 and 15a of a pair of rotary transformers 16 and 16a. While the linkage 12 may be of any suitable form, the arrangement illustrated in Fig. 1 is preferably of the type described and claimed in a copending application of Robert Adler, entitled Translating Apparatus and Follow-Up Systems, filed April 2, 1949, having Serial No. 85,236, now U. S. Patent 2,583,535 dated January 29, 1952, and assigned to the same assignee as the present invention.

An oscillator 17 is employed to excite the rotary transformer 16 with an alternating voltage of predetermined constant frequency and amplitude through a coil 18. The rotor 15 is rotatable about a fixed axis 19, the amount of oscillation of the rotor being substantially a linear function of the movement of the stylus 11 along the indicated Y coordinate axis.

The link 14, shown schematically in Fig. 1, is rigidly secured to the shaft 19 of the rotor 15 with the result that any turning of this link causes a corresponding angular movement of the rotor between the pole faces of the transformer 16. It will be apparent upon reference to Fig. 1 that a movement of the stylus 11 along the indicated Y axis will cause a pivoting of the link 14 and the corresponding movement of the rotor 15.

The rotary transformer 16 comprises a core of the type of iron usually used for such purposes, the rotor 15, rotatable in a suitable air gap, and the necessary windings. The rotor 15 has an iron core and includes a winding 15' as shown. The rotor core and coil and the pole faces are so designed that for a limited angular movement of the rotor the voltage induced in the rotor coil is a linear function of the rotor position when the coil 18 is excited with a voltage of constant magnitude and frequency. Such limited angular movement of the rotor is preferably less than 45° to either side of a normal position in which the rotor winding 15' is parallel to the field and the induced voltage is zero. The output of rotor coil 15' is in series with that of a fixed secondary coil 20, the combined output voltage also being a linear function of the angular position of the rotor and being fed into the transmission line T.

Similar apparatus is shown for producing a voltage which is a linear function of the position of the stylus 11 along the X coordinate axis. Since this apparatus is essentially the same as that described immediately above, a detailed description is considered unnecessary except to point out that an oscillator 21 is employed which is similar to the Y oscillator 17 and produces an alternating voltage of constant amplitude and constant but substantially different frequency than that of the Y oscillator. The fact that these frequencies differ substantially permits transmission of the two signals over the same transmission line and the separation thereof at the receiving station through the means of suitable filters.

During the transmission of the signals, they are subject to attenuation or, under certain circumstances, amplification or other adverse variations in amplitude. Such variations are undesirable since the intelligence transmitted by the two signals is in the form of amplitude modulation or variation. Because of the difficulty or impossibility of avoiding such adverse amplitude variations, means are provided for compensating therefor.

A third or reference oscillator 22 is provided which produces a reference signal of constant frequency and amplitude, the frequency differing from that of the Y oscillator 17 and the X oscillator 21, and preferably being of an intermediate value. The output signal is also fed into the same transmission line T and carried thereby to the receiving station R.

At the receiving station R, the three signals first pass through an automatic gain control amplifier 25, the output of which passes to three filters, the Y filter 26 permitting the passage of only the Y signal frequency, the X filter 27 permitting the passage of only the X signal frequency and the reference filter 28 passing only the reference signal frequency. The reference signal passes into a delay network the output of which is used to bias the automatic gain control amplifier. Since the reference signal is of a constant magnitude as fed to the transmission line, any variation in the amplitude of the reference signal above or below a predetermined value resulting from its transmission or its subjection to other adverse conditions is readily determinable and this signal may be utilized to bias the amplifier and thereby to control the amplifier gain. Since the intelligence signals pass through the same amplifier, they will be amplified by the same ratio as the reference signal, and, accordingly, the desired ratio between the reference signal and the intelligence signals will be maintained. The use of a single common amplifier is advantageous as it insures that amplification of the various signals is equal. Separate, variable gain amplifiers for each signal are somewhat more difficult to control with sufficient accuracy for amplifying all signals by the same ratio. Preferably, there is no subsequent amplification of the signals and the attenuation introduced by other portions of the circuits is made equal for the three signals by selection of circuit components of proper value. Consequently, the relative magnitudes of these signals are maintained throughout corresponding portions of the circuits.

The amplified reference signal also passes to the exciting coil 31 of a rotary transformer 32 having a rotor 33. This rotary transformer is preferably similar in all substantial respects to the rotary transformer 16. The voltage output of the rotor winding 33' is in series with that of a fixed secondary coil 34 and passes to a rectifier 35, the rectified signal then passing to an error signal network or unit 36. The amplitude of the signal passing to the rectifier 35 is a linear function of the amplitude of the reference signal entering the exciting coil 31 and is also a linear function of the position of the rotor 33 for the same reasons explained above in connection with the rotary transformer 16.

The Y signal also passes through a rectifier 37 and into the error signal network or unit 36 wherein its magnitude is compared to that of the signal coming from the rectifier 35. The error signal unit produces an error or difference signal which is a function of the difference in the magnitude of these signals, this error signal then passing through a D. C. amplifier 38 and energizing the winding of a motor 39 which drives stylus 40 along the Y coordinate axis through a linkage system 41 and operating arms 42 and 42'. The link 42, shown schematically in Fig. 1, is rigidly secured to the shaft of the motor 39 with the result that any turning of the motor causes this link to swing about the axis of the motor. It will be apparent upon reference to Fig. 1 that this in turn will cause the stylus 40 to move along the Y coordinate axis.

The rotor 33 of the rotary transformer 32 is also driven by the motor 39 with the result that when the stylus 40 has reached the position along the Y coordinate axis corresponding to that of the directing stylus 11, the rotor 33 will be in a position such that the voltage induced in winding 34 and in the winding 33' of rotor 33 and rectified by rectifier 35 is equal to the output signal voltage of rectifier 37 and no error signal is forthcoming.

The Y signal, after passing through the rectifier 37, is also fed to an acceleration control network 43, the output of which passes to the D. C. amplifier along with the error signal. The function of the acceleration control network is to provide a signal to the motor 39 proportional in magnitude to the acceleration of the directing stylus 11, this causing the stylus 40 to follow precisely the movements of the directing stylus 11 even though these consist largely of transient components. As will be pointed out subsequently, an error rate damping signal may also be sent to the D. C. amplifier 38 from the error network 36 for damping the movements of linkage 41 and connected moving parts, this producing a stability in the operation of the system which is not otherwise generally attained.

The operation of the acceleration control network and the necessary circuits therein are described and claimed in a copending application of Robert Adler entitled Improvements in Follow-Up Apparatus and Systems, filed April 4, 1949, having Serial No. 85,354, now U. S. Patent 2,623,943 dated December 30, 1952, and assigned to the same assignee as the present invention. Since this network is not a part of the present invention, it will not be further described herein.

Accurate positioning of the follow-up element is obtained by the embodiment of the invention, shown in the drawings and described above, by maintaining a proper or predetermined relationship between the reference signal as it enters the exciting coil 31 of the rotary transformer 32 and the intelligence signal as it passes to the rectifier 37. As long as the ratio of these signals at these points is maintained proportional to the ratio of these signals at the sending station, the follow-up element will seek a position corresponding to that of the directing element. This ratio is maintained by subjecting the reference signal to the same variable attenuating and amplifying conditions to which the intelligence signal is subjected, these conditions including primarily those encountered in the transmission of the signals and those encountered in the sending or receiving stations such as in the automatic gain control amplifier 25.

It will be apparent that any independent but fixed gain amplification or attenuation of either or both signals can be taken into consideration in establishing the desired predetermined ratio of the intelligence signals with respect to the reference signals as they appear upon entering the rectifier 37 and exciting coil 31 respectively. Thus the various filters and rectifiers shown and any fixed gain amplifiers which may be desired for practical purposes in the individual signal circuits can be taken into consideration in maintaining the proper relationship between the intelligence signals and the reference signal at the two points mentioned immediately above.

The values of the signals at these same points may be maintained at substantially proper absolute values through the use of an automatic gain control amplifier in order that the magnitude of the error signal produced will be of such a valve for a given displacement of the follow-up element with respect to the directing element that the desired dynamic characteristics such as damping and speed of response are maintained. Maintenance of the intelligence signal at values corresponding to a predetermined central magnitude will also result in a signal of the proper magnitude entering the acceleration control network.

To illustrate the effect of maintaining the intelligance signals and the reference signal at a proper or predetermined ratio as they enter the rectifier 37 and the transformer exciting coil, respectively, let it be assumed that the two rotary transformers 16 and 32 are excited by voltages of equal amplitude. Let it be assumed also that the intelligence signal emitting from the sending transformer 16 is transmitted to the receiving station and fed to the rectifier 37 without change in amplitude. If the receiving stylus 40 is in the proper position with respect to the directing stylus 11, the rotor 33 of the transformer 32 will be in the same relative position as the rotor 15 and the signal it feeds to the rectifier 35 must equal in magnitude the intelligence signal as received, with the result that no error signal is produced and the motor 39 remains de-energized and stationary.

If the directing stylus is now moved, the amplitude of the intelligence signal emitting from the rotary transformer 16 and delivered to the rectifier 37 changes. The amplitude of this signal will no longer equal the amplitude of the signal sent to the rectifier 35, with the result that a difference or error signal is produced and sent to the motor 39 through the D. C. amplifier 38. The motor will then drive the stylus 40 through the linkage system until the stylus reaches a position corresponding to the new position of the directing stylus 11. When the stylus 40 reaches this position, the transformer 32 will send a signal to the rectifier 35 which is equal in magnitude to the new intelligence signal and again a balance is obtained between these signals and no error signal produced. It will be understood that the receiving stylus 40 tends to follow very closely the movements of the directing stylus 11 and that the actual error signal produced at any instant will depend upon the lag of the receiving stylus or the angle between the two transformer rotors 15 and 33.

With the stylus 40 in its proper position, let it now be assumed that the intelligence signal is attenuated before reaching the rectifier 37. If the excitation voltages for the two rotary transformers were to remain the same, the signal sent to the rectifier 35, being unaffected by this attenuation, would no longer equal the intelligence signal in magnitude and an unwanted error signal would be produced with the result that the stylus 40 would be driven from its proper position. However, if the excitation voltage for the transformer 32 is attenuated in the same proportion as the intelligence signal, the signal emitting from the transformer 32 and delivered to the rectifier 35, being a linear function of the excitation voltage, will also be attenuated in the same proportion. Accordingly, the intelligence signal appearing at the rectifier 37 will balance the signal sent to the rectifier 35 and no error signal will be produced.

If the directing stylus is now moved, the amplitude of the intelligence signal as generated will be changed. Accordingly, the intelligence signal delivered to the rectifier 37, attenuated as before, will also be changed and will no longer balance the signal sent to the rectifier 35. This unbalance produces an error signal which drives the stylus 40 to the proper position but the magnitude of the error signal will be reduced in proportion to the attenuation of the intelligence signal and the reference signal, that is, where the signals received by the two rectifiers 35 and 37 are both attenuated by a certain percentage, the difference between their magnitudes is also attenuated by the same percentage. This will result in a sluggish response of the follow-up element but the element will seek and, except for frictional effects, will attain its proper position corresponding to that of the directing element.

Thus it is seen that the error signal will vary in proportion to the attenuation or other adverse variations of the intelligence and reference signals, but that the error signal will always be zero when the receiving stylus is in the proper position with respect to the directing stylus. Accordingly, the receiving stylus will always seek the proper position. It is to be noted that this is true whether the signals are amplified at the receiving station or not.

In the interest of clarity, the receiving station R, as shown in Fig. 1, has been made incomplete as to the major portion of the X signal circuits since these are identical to the circuits for the Y signal. The arrow 44 leading away from the X filter 27 and the arrow 45 branching off the reference signal circuit lead to another rotary transformer, to another error signal unit and D. C. amplifier, and to another motor for controlling the X coordinate movements of stylus 40 through the links 46, the method of operation being identical to that of the Y signal circuit.

Reference is now made to Fig. 2 in which is disclosed in detail the circuits lying between the automatic gain control amplifier 25 and the D. C. amplifier 38 with the exception of the acceleration control network which is again indicated in block form for the reasons given above.

The output of the automatic gain control amplifier 25 passes to the reference signal filter 28 which comprises a $\pi$ network including inductance coils 51, 50 and 53, and associated condensers 54, 55 and 56 connected as shown. The constants are so chosen that the reference signal will pass through the filter while the intelligence signals will be blocked thereby. The reference signal then passes through a D. C. blocking condenser 57, through the exciting coil 31 of the rotary transformer 32, and to ground through another D. C. blocking condenser 57a.

The reference signal, after passing through the first D. C. blocking condenser 57, also passes to the delay network 29 which includes a rectifier 59, a load resistor 60, and filter means including resistor 61 and condensers 62 and 63, the filter means serving to level out partially any voltage peaks which may pass through the rectifier 59. The rectifier 59, which is arranged to pass only negative impulses to the filter means and the amplifier may be of any suitable form and is shown only schematically in Fig. 2.

The blocking condensers 57 and 57a are provided to isolate a direct current biasing voltage applied to the circuit at the point designated 58 from a source which is not shown in the drawings but which may be of any suitable form such as a battery. This voltage biases the circuit with a fixed positive polarity equal to a predetermined desired amplitude of the reference signal as it leaves the filter 28 and enters the transformer exciting coil 31. As long as the peak value of the reference signal, as it emerges from the filter 28, is less than the voltage of the direct current bias voltage applied at the point 58, the negative peaks of the reference signal will be offset by the bias voltage, no current will pass through the rectifier 59, and the amplifier is free to operate at maximum gain. However, in the event that the peak voltage of the reference signal, as it emerges from the filter 28, exceeds the bias voltage, the tips of the negative peaks will pass through the rectifier and back to the automatic gain control amplifier 25 to bias that amplifier in such a way as to reduce the gain thereof. Accordingly, as long as the amplitude of the amplified reference signal, as emitted from the reference filter 28, is less than the predetermined desired amplitude of the reference signal, the amplifier is free to operate at its maximum gain, but when the amplified reference signal becomes greater than the desired reference signal amplitude, the amplifier gain is cut down by a biasing voltage, fed through the delay network 29, with the result that the amplified reference signal will remain at substantially the desired amplitude.

The output signal of the rotary transformer, as produced by the series arrangement of the rotor coil 33′ and the fixed secondary coil 34, is fed to the primary of a transformer 65. The secondary winding of the transformer 65 is connected to the plates 66 of a full wave rectifier tube 67 and the single cathode 68 of this tube is connected through a resistor 69 to the center tap of the secondary coil of the transformer. Accordingly, a pulsating direct current is caused to flow through the resistor 69.

The voltage appearing across the resistor 69 is impressed on a condenser 70 and a resistor 71, these latter two components being in series with each other and in parallel with the resistor 69. Accordingly, the voltage across condenser 70 is a relatively smooth D. C. voltage which is a linear function of the voltage output of the rotary transformer 32. An error signal is produced by bucking the D. C. voltage appearing across the condenser 70 with a similar voltage corresponding to the Y signal, the origin of which voltage will now be described.

The output of the automatic gain control amplifier 25 is fed to the Y filter 26 which comprises a $\pi$-network including inductances 81, 82 and 83, and condensers 84, 85 and 86 connected as shown. The constants are so chosen that the filter permits the passage of the Y signal frequency while blocking the passage of other frequencies as is well understood in the art. The Y signal then passes through the primary winding of a transformer 87, the secondary winding of which is connected to the two plates 88 and 89 of a rectifier tube 90 which may be identical to the rectifier tube 67. The cathode 91 of this rectifier is connected through a resistor 92 to the mid-point of the secondary winding of the transformer 87.

Accordingly, a pulsating direct current passes through the resistor 92, the magnitude of which is a linear function of the amplitude of the Y signal. The voltage across the resistor 92 is impressed on a condenser 93 and a resistor 94 which are arranged in series with each other and in parallel with the resistor 92.

The terminal of the condenser 93 which is connected to cathode 91 is connected by a conductor 95 with the terminal of the condenser 70 which in turn is connected to cathode 68. The other terminals of these condensers are connected through a resistor 96 having a relatively high resistance. It will now be apparent that any difference in the direct current voltages appearing across the condensers 70 and 93 will appear across the resistor 96.

An adjustable tap 97 is provided for tapping off any desired portion of the error voltage appearing across resistor 96 and the voltage between the adjustable tap 97 and ground is transmitted to the direct current amplifier 38 through a resistor 98. A condenser 99 is connected to the variable tap 97 and through a conductor 100 to the ungrounded side of the resistor 96 in order to provide the error rate damping voltage. The damping action obtained thereby will not be described in detail herein since it does not form a part of the invention.

A pair of resistors 101 and 102 are arranged in series across the condenser 93, and, accordingly, have impressed thereon a direct current voltage whose magnitude is a linear function of the amplitude of the Y signal.

A portion of this voltage is fed to the acceleration control network 43 through a conductor 103 which is connected between the two resistors 101 and 102. The relative values of these two resistors may be selected in order that the desired portion of the voltage appearing across the condenser 93 may be fed through the conductor 103 to the acceleration control network. The output of this network is fed through a resistor 104 to the direct current amplifier 38 wherein it is amplified prior to its being transmitted to the motor 39.

The circuits shown in Fig. 2 are those for the reference signal and the Y signal. It will be apparent that another circuit, similar to the Y signal circuit, must be provided in the illustrated embodiment of the invention for the X signal. Such a circuit may be identical to the Y signal circuit with the exception that the X filter 27 is designed to pass only the X signal frequency. The reference signal after passing through the blocking condenser 57, passes to the exciting coil of a rotary transformer associated with the X signal circuit, as indicated by the arrow 45.

The invention has been described above as applied to a tele-autograph system but it is to be understood that this is exemplary only, the invention being applicable in modified form to follow-up systems generally and to any intelligence transmitting system wherein the intelligence is transmitted in the form of a variable magnitude signal.

A transmission line is shown in the drawings, but it is to be understood that the invention is applicable to a wireless communication system as well. Since the characteristics of the transmission medium may have a somewhat different effect upon signals of different frequencies, a frequency is preferred for the reference signal which lies intermediate the frequencies of the X signal and the Y signal, and the signal frequencies are chosen as close together as they may be within the ability of the filters to separate them. In one form of the invention the frequencies of the X and Y and reference signals are 900, 1600 and 1200 cycles per second, respectively.

In the embodiment illustrated, two measures are resorted to for utilizing the reference signal to condition the receiving station to eliminate or minimize the effect of attenuation or other adverse variations in the magnitude of the intelligence signals resulting from their subjection to conditions such as those encountered during transmission over the transmission line T. It will be apparent that these measures will be effective in eliminating or minimizing such adverse variations in the magnitude of the intelligence signals regardless of their cause. Conditions may be encountered, for example, within the sending station S or the receiving station R which would cause such adverse variations; and as long as the reference signal is subjected to the same adverse conditions, the system will be effective.

The two measures mentioned immediately above are, first, the utilization of the reference signal to excite the local generator of the servomechanism whereby the local signal is made a linear function of the magnitude of the reference signal as well as a function of the position of the following or receiving element, and, second, the amplification of the intelligence signal to a value corresponding to a desired predetermined central value. The use of the second measure alone, namely the controlled amplification of the intelligence signal, while theoretically sufficient, is limited by the accuracy with which the amplifier can be controlled. Accordingly, resort to the first measure is necessary where a high degree of accuracy is required in the final positioning of the follow-up element.

The first measure, namely, the utilization of the reference signal to excite the local generator of the servomechanism, will alone result in a high degree of accuracy. However, the use of controlled amplification in conjunction therewith insures that the voltages appearing in the servo system are maintained within the desired range over the whole range of line attenuation thereby holding the dynamic characteristics of the servo system constant.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In the receiving station of a follow-up system wherein a transmitted intelligence signal is continuously compared with a locally generated signal determined at each instant by the position of a following element, said system including means for producing a reference signal of substantially constant magnitude, and means for imposing upon said reference signal adverse variations in magnitude proportional to those imposed upon said intelligence signal, means for substantially eliminating the effects of adverse variations in the magnitude of an electric intelligence signal of variable magnitude comprising, an amplifier for said reference signal and said intelligence signal, means for controlling said amplifier to maintain said reference signal as amplified at a substantially constant predetermined magnitude, means for utilizing said reference signal as amplified to excite such local generator, and means for continuously producing a second intelligence signal the magnitude of which is a function of the difference in magnitude between said first intelligence signal as amplified and such local signal.

2. In a follow-up system for moving a following element to positions corresponding to those of a directing element, a generator associated with such directing element for producing an alternating current constant frequency signal whose amplitude is a function of the position of such directing element, a generator associated with such directing element for producing a reference signal of constant frequency and amplitude, said second-named frequency differing substantially from said first-named frequency, automatic gain control amplifying means for said signals associated with said following element, said amplifying means maintaining the amplitude of said reference signal as amplified at a substantially constant predetermined value whereby a predetermined movement of said directing element will produce the same output from said amplifying means irrespective of adverse variations in the transmission of said signals, and means for utilizing at least said intelligence signal as amplified to control the position of such following element.

3. In a follow-up system for moving a following element to positions corresponding to those of a directing element, a generator associated with such directing element for producing an alternating current constant frequency signal whose amplitude is a function of the position of such directing element, a generator associated with such directing element for producing a reference signal of constant frequency and amplitude, said second-named frequency differing substantially from said first-named frequency, amplifying means for said signals associated with said following element, means for transmitting said signals to said amplifier, means including a source of bias voltage of constant magnitude for producing a control signal for said amplifying means, the magnitude of such control signal being a function of any excess in magnitude of said reference signal as amplified over such bias voltage, said control signal controlling the gain of said amplifying means whereby the amplitude of said reference signal as amplified is maintained at a substantially constant predetermined value, and means for utilizing at least said intelligence as amplified to control the position of such following element.

4. A follow-up system transmitter comprising, a directing element, means for producing an intelligence signal whose amplitude corresponds at each instant to the position of said directing element, said intelligence signal means comprising a rotary transformer having a fixed member in series with a rotary member whose rotary member and fixed member are coupled to said directing element, means for generating a constant amplitude reference signal, and means for transmitting both said signals over the same transmitting medium.

5. In a follow-up system for moving a receiving element to positions corresponding to those of a directing element, a generator associated with such directing element for producing an intelligence signal whose magnitude is a function of the position of such a directing element, a generator in the vicinity of such a directing element for producing a reference signal of substantially constant magnitude, means for transmitting such signals to the vicinity of such receiving element, an amplifier in the vicinity of such receiving element for said reference signal and said intelligence signal, means for controlling said amplifier to maintain said reference signal as amplified at a substantially constant predetermined magnitude, a local signal generator actuated by such a receiving element and excited by such reference signal, said local signal generator producing an output signal whose magnitude is a function of the position of such receiving element and a linear function of such reference signal excitation, an error signal network receiving such intelligence signal and such local signal for producing a control signal the magnitude of which is a function of the difference in magnitude between such received signals, and means for utilizing such control signal for controlling the position of such receiving element.

6. In the receiving station of a follow-up system wherein a transmitted intelligence signal is continuously compared with a signal from a local generator determined at each instant by the position of a following element, said system including means for producing a reference signal of substantially constant magnitude, and means for imposing upon said reference signal adverse variations in magnitude proportional to those imposed upon said intelligence signal, means for substantially eliminating the effects of adverse variations in the magnitude of such intelligence signal of variable magnitude comprising, amplifying means for said signals associated with said following element, means for transmitting said signals to said amplifier, means including a source of bias voltage of constant magnitude for producing a control signal for said amplifying means, the magnitude of such control signal being a function of any excess in magnitude of said reference signal as amplified over such bias voltage, said control signal controlling the gain of said amplifying means whereby the amplitude of said reference signal as amplified is maintained at a substantially constant predetermined value, means for utilizing said reference signal as amplified to excite such local generator, and means for continuously producing a second intelligence signal the magnitude of which is a function of the difference in magnitude between said first intelligence signal as amplified and such local signal.

ROBERT ADLER.

References Cited in the file of this patent

UNITED STATES PATENTS

| Number | Name | Date |
|---|---|---|
| 1,822,868 | Grimes | Sept. 8, 1931 |
| 2,039,404 | Green et al. | May 5, 1936 |
| 2,413,300 | Dunn et al. | Dec. 31, 1946 |
| 2,480,713 | Cherry | Aug. 3, 1949 |
| 2,502,971 | Matte | Apr. 4, 1950 |

FOREIGN PATENTS

| Number | Country | Date |
|---|---|---|
| 276,900 | Germany | July 22, 1914 |